Jan. 26, 1926.
C. G. PERKINS
OIL INDICATOR
Filed Nov. 14, 1923
1,571,142
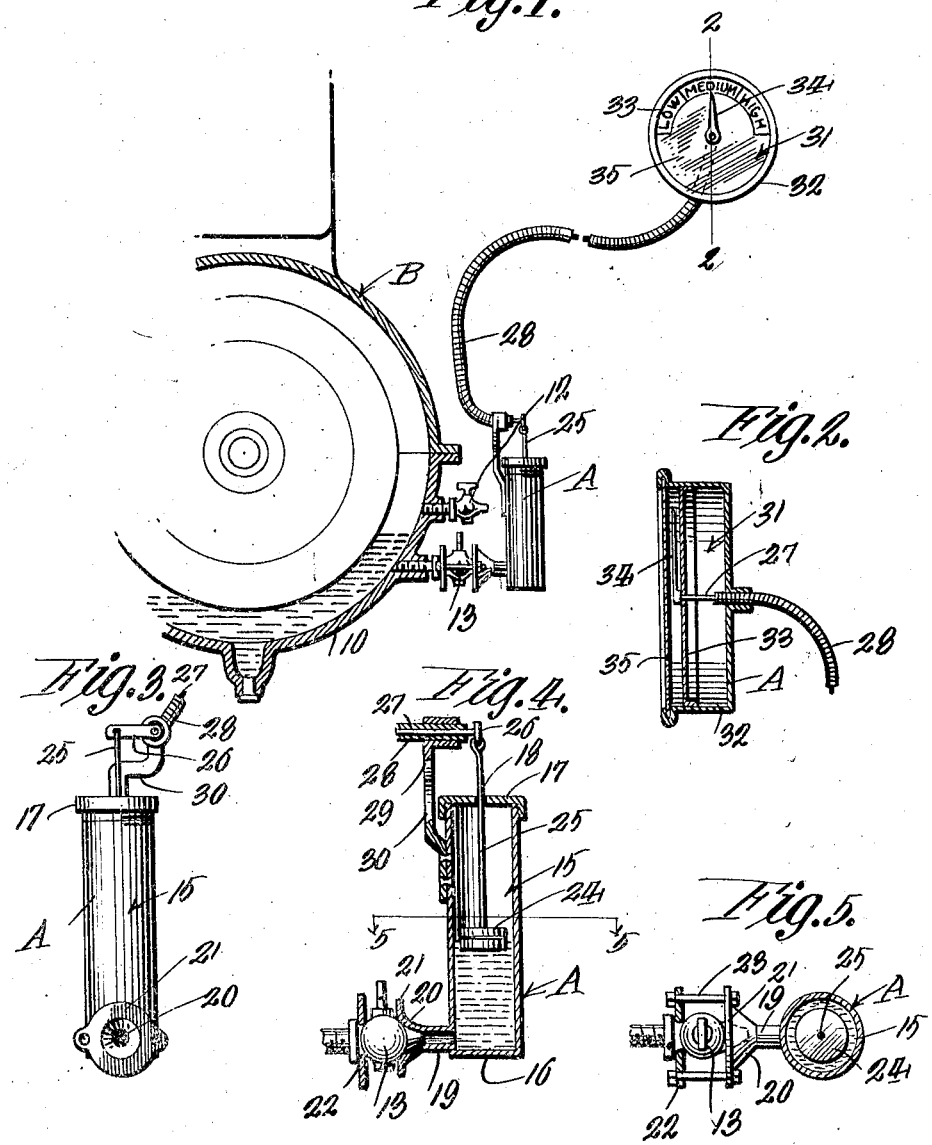
WITNESSES
Inventor
CHARLES G. PERKINS
By
Attorney Patented Jan. 26, 1926.

1,571,142

UNITED STATES PATENT OFFICE.

CHARLES G. PERKINS, OF KINROSS, MICHIGAN.

OIL INDICATOR.

Application filed November 14, 1923. Serial No. 674,763.

*To all whom it may concern:*

Be it known that I, CHARLES G. PERKINS, a citizen of the United States, residing at Kinross, in the county of Chippewa and State of Michigan, have invented certain new and useful Improvements in an Oil Indicator, of which the following is a specification.

This invention appertains to automobiles and the primary object of the invention is to provide novel means for indicating to the driver of the automobile the level of the lubricating oil in the crank case of the power plant of the vehicle.

Another prime object of the invention is to provide a novel oil level indicator which can be readily connected to the crank case of an internal combustion engine without any change in the construction thereof, the indicator having novel means for permitting the connection thereof with the lower petcock of the crank case.

A further object of the invention is to provide an improved oil level indicator embodying a cylinder having communication with the lower petcock of a crank case of an internal combustion engine of an automobile and a float mounted in said cylinder adapted to raise and lower with the level of the oil in the cylinder and crank case having operative connection through the medium of a crank and flexible shaft with an indicator dial, which is adapted to be disposed on the instrument board of the automobile.

A still further object of the invention is to provide an improved device for indicating the level of oil in the crank case of an internal combustion engine of the above character, which will be durable and efficient in use, one that will be simple and easy to manufacture and one which can be placed upon the market and incorporated with an automobile at a minimum cost.

With these and other objects in view, the invention consists in the novel construction, arrangement and formation of parts, as will be hereinafter more specifically described, claimed, and illustrated in the accompanying drawings, in which drawings:

Figure 1 is a vertical section through an internal combustion engine showing the improved oil level indicator incorporated therewith.

Figure 2 is a detail diametric section through the indicating dial of the indicator taken on the line 2—2 of Figure 1.

Figure 3 is an elevation of the cylinder and associate parts of the indicator.

Figure 4 is a detail vertical section through the indicator showing the novel cylinder, and float, and the novel means for connecting the cylinder with the lower petcock of the crank case, and Figure 5 is a detail horizontal section taken on the line 5—5 of Figure 4 showing the novel means for connecting the cylinder with the lower petcock of the crank case.

Referring to the drawings in detail, wherein similar reference characters designate corresponding parts throughout the several views, the letter A generally indicates the improved oil level indicator and B an internal combustion engine of an automobile with which the same is associated.

The engine B is of a conventional type and includes the usual crank case 10 having the upper and lower oil level indicating petcocks 12 and 13 as is usual in the ordinary construction.

The improved oil level indicator A comprises a cylinder 15 having its lower end closed by a wall 16, and its upper end closed by a removable threaded cap 17 which is provided with an axial guide opening 18. The extreme lower end of the cylinder 15 is provided with an inlet pipe 19 which carries a flared connecting mouth 20 which may be provided with a peripheral attaching flange 21. The flared mouth 20 is so shaped as to snugly receive the outlet end of the lower petcock 13 and in order to rigidly hold the cylinder 15 in place, I place an annular retaining plate or washer 22 on said lower petcock 13 in rear of the body thereof. Suitable connecting bolts 23 can now be utilized for connecting the flange 21 of the flared mouth 20 with the annular retaining plate or washer 22. It is obvious that the level of the oil in the cylinder 15 will rise and fall corresponding to the level of the oil in the crank case 10 of the internal combustion engine B. Mounted within the cylinder 15 is a suitable float 25, which is adapted to raise and lower with the oil in the cylinder. This float 24 has rigidly secured thereto an upstanding float rod 25 which extends through the guide opening 18. The upper end of the float rod 25 is connected to the outer end of the crank 26 which is rigidly connected to a flexible operating shaft 27. This operating shaft 27 is housed within a flexible housing 28 and the lower end of the housing can be secured to a suitable sleeve or the like 29 rigidly connected to the cylinder 15 through the medium of a bracket 30. The flexible housing 28 is connected at its upper end to the indicator 31 which may be secured at any point in the automobile such as on the dashboard thereof. This indicator 31 includes a housing 32 supporting a dial plate 33 which may be graduated or marked with suitable indicia such as "Low", "Medium" and "High". The flexible operating shaft 27 extends into the housing 32 and through the axial center of the dial plate 33 and has rigidly secured thereto the indicating pointer 34 which is adapted to travel over the indicator plate 33 when the flexible shaft 27 is turned by the crank 26. The indicating pointer 34 and dial plate 33 can be protected by a suitable transparent plate 35 if so desired.

In operation of the improved oil level indicator, it can be seen that as the oil level changes in the cylinder 15, that the float 24 will be raised or lowered therewith, thus swinging the crank 26 and turning the shaft 27, which will move the indicating pointer over the dial plate.

From the foregoing description, it can be seen that I have provided an improved oil level indicator of exceptionally simple and durable construction which can be attached to the crank case of an internal combustion engine without any change therein.

Changes in details may be made without departing from the spirit or the scope of the invention.

What I claim as new is:

A lubricant indicator for association with one of the crank case lubricant drain cocks comprising a cylinder, A flared tubular element leading laterally from the cylinder adapted to be received on the pet cock, means for securing the flared tubular element to the petcock, an arm extending vertically from the cylinder, a flexible tube having one end supported by the arm, a flexible shaft in the tube, a crank arm extending from one end of the shaft and disposed above the cylinder, a float in the cylinder, a rigid connection between the float and the crank arm, and a registering mechanism including a movable hand operatively connected with the flexible shaft.

In testimony whereof I affix my signature.

CHARLES G. PERKINS.